United States Patent [19]

Woitschella et al.

[11] 4,095,759
[45] Jun. 20, 1978

[54] DEVICE FOR STABILIZATION OF CAPTIVE AIRCRAFT

[75] Inventors: Heinz Woitschella; Wolfgang Reuter, both of Friedrichshafen; Rolf Swik, Munich, all of Germany

[73] Assignee: Dornier GmbH, Germany

[21] Appl. No.: 683,966

[22] Filed: May 6, 1976

Related U.S. Application Data

[63] Continuation-in-part of Ser. No. 541,253, Jan. 15, 1975.

[30] Foreign Application Priority Data

Mar. 14, 1974 Germany .............................. 2412256

[51] Int. Cl.² ............................................ B64C 27/68
[52] U.S. Cl. ............................. 244/17.17; 244/17.13
[58] Field of Search ..................... 244/17.13, 17.17, 33, 244/17.19, 175, 179, 181, 177

[56] References Cited

U.S. PATENT DOCUMENTS

| | | | |
|---|---|---|---|
| 2,453,857 | 11/1948 | Platt et al. ........................... | 244/17.17 |
| 2,995,740 | 8/1961 | Shreckengost ............... | 244/17.17 X |
| 2,998,210 | 8/1961 | Carter ........................... | 244/17.13 X |
| 3,117,749 | 1/1964 | Angel ................................. | 244/17.17 |
| 3,176,288 | 3/1965 | Wyatt ............................ | 244/17.17 X |
| 3,223,358 | 12/1965 | Quick ................................ | 244/17.17 |

Primary Examiner—Barry L. Kelmachter
Attorney, Agent, or Firm—James E. Bryan

[57] ABSTRACT

This invention relates to an improvement in a device for the stabilization of a captive aircraft with a drive unit for rotor blades which produce lift with the aid of thrust, wherein a mooring line engages below the aircraft center of gravity, and wherein the device includes a control device intervening in the drive unit and the rotor blades for producing thrust,
the improvement comprising
a position regulator and translation damper for the purpose of influencing controls for the rolling and pitching axes,
an angular velocity regulator for the purpose of influencing yaw control, and
a cable line traction regulator operating in dependence upon cable line traction in immediate proximity to the aircraft, and in dependence upon an output or power regulator for the drive unit, for the purpose of influencing output power regulation and the rotor blades for producing lift.

3 Claims, 5 Drawing Figures

DEVICE FOR STABILIZATION OF CAPTIVE AIRCRAFT

This application is a continuation-in-part of application Ser. No. 541,253, filed Jan. 15, 1975 now abandoned.

The present invention relates to a device for stabilization of captive aircraft comprising a drive unit for means which produce lift by thrust (such as rotating wings, blowers, lift jet engines, or the like), wherein the mooring line or anchoring cable engages below the aircraft center of gravity.

A number of problems arise in aircraft of this type, and the cause thereof is that an independent stabilization and regulation of the rotary and translatory degrees of freedom of the aircraft can be controlled only with difficulty as a result of the stray coupling by means of the mooring line. An aircraft of this type is monotonically unstable in position and translation when fastening is effected below the center of gravity of the aircraft.

It is known from German Offenlegungsschrift No. 1,431,250, to employ captive aircraft for receiving sensors, such as cameras, directional antennas, or the like, wherein a movement uncoupling has been carried out between the aircraft and the sensing means, and the stabilization of the aircraft itself has been accomplished by virtue of the chosen design of the aircraft with respect to the cable attachment and pendulum effect. Depending upon the wind direction and wind intensity, drift movements occur relative to the mooring point on the ground. Furthermore, in the known aircraft, one attempts by means of a high margin of power to maintain these drifts within limits in order to prevent the aircraft from getting into critical flight attitude which may lead to a crash.

It is the object of the present invention to provide a stabilizing device with which the aforementioned disadvantages of known devices are eliminated. The drift of the craft is intended to maintain flight-secure limits with a uniformly automatic regulation of the minimal power required. In addition thereto, the aircraft as a carrier for sensing means is intended to automatically maintain a perpendicular and on-course position.

This object is obtained, in accordance with the present invention, with a stabilizing device comprising (a) for influencing the controls for the rolling and pitching axes, a position regulation and a translation damping; (b) for influencing the yaw control an angular velocity regulating means, and (c) for influencing the power regulation and/or the means producing lift, a cable line traction regulating means operating in dependence upon the cable line traction in immediate proximity to the aircraft, and in dependence upon the power regulating means of the drive unit.

According to another embodiment of the present invention, for a construction of the device for a rotary wing aircraft, one further feature is that the aircraft position regulation or control and the translation damping acts upon the cyclic rotor blade control, the angular velocity regulating means influences the yaw tail unit, and the cable line traction regulating means is effective in dependence upon the cable line traction in immediate proximity to the aircraft, and in dependence upon the rotor speed for influencing the collective rotor blade control and/or the power regulation of the drive unit. A stabilizing device as provided by the present invention advantageously affords, in addition to a significant saving in fuel and in addition to maintaining a predetermined drift limit, a required position alignment. Additionally, there exists the possibility of steering the aircraft from a ground station either manually or automatically.

The cable line traction measuring device positioned in immediate proximity to the aircraft acts upon the aircraft, in conjunction with the coordinated regulating device, both by way of the output or power regulating member, and also by way of the means producing the lift, for example the collective rotor blade setting, whereby the aircraft may be maintained above ground with a minimum of the required margin of power.

Furthermore, for the further embodiment of the present invention, another feature is that inserted in the position regulation about the rolling and the pitching axes as well as the translation damping means of the longitudinal and transverse movements is a single integrator each which integrates jointly the deviation of the actual position value from the desired position value and the acceleration signal compensated by earth accelerations. Such an embodiment results in the advantage that variations in the compensation of the earth gravitation will in this case not manifest themselves in significant translation movements of the aircraft. This prevents that, as a consequence of separate integration, on the one hand in case of parallel connection of the integrators, the latter drift apart and, on the other hand, in case of the cascade connection of the integrators, significant translation movements of the aircraft be caused as a result of compensation variations.

One embodiment of the stabilizing device according to the present invention is illustrated in the accompanying drawings, wherein.

Figure 1:
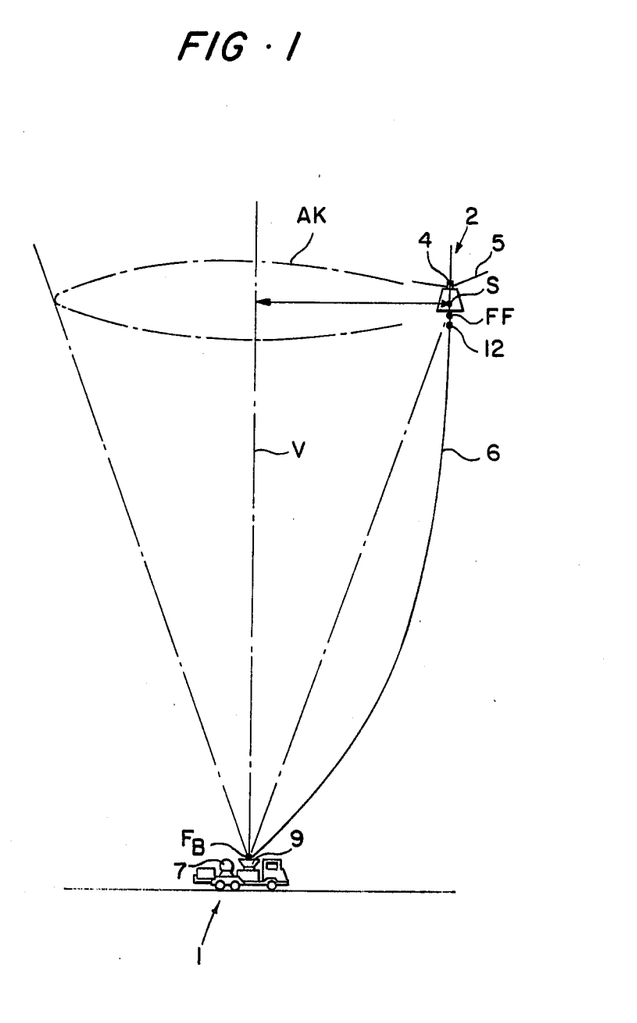
FIG. 1 is a schematic representation of a captive unmanned aircraft in the flight position thereof, together with the ground station.

FIG. 1 schematically illustrates the aircraft in the hovering flight condition in conjunction with the ground station, here represented as a vehicle.

Figure 2:
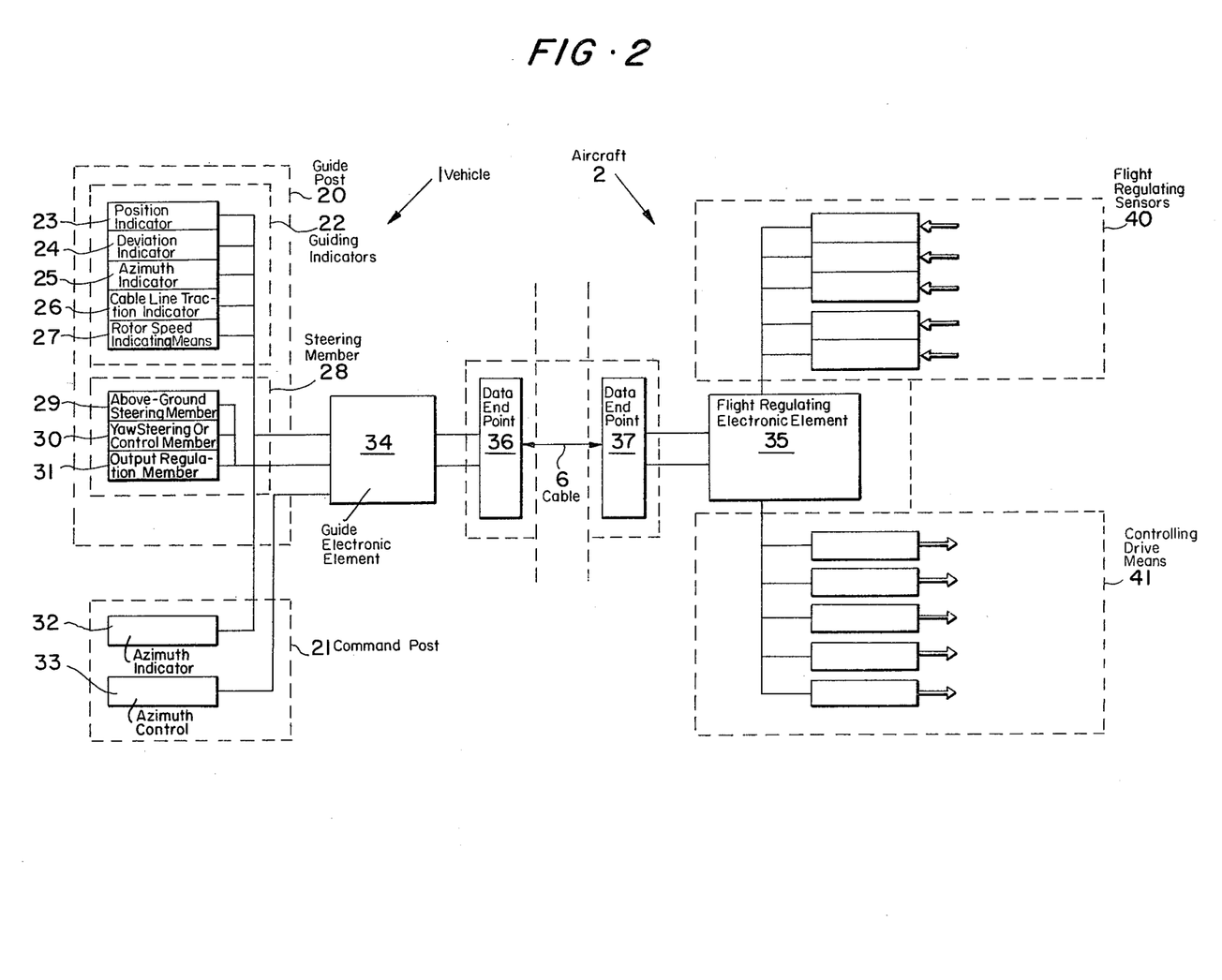
FIG. 2 illustrates, in the form of a block diagram, the structure of the control and regulating device on the ground and on board.

The vehicle 1 serving as a ground station houses the guide post 20 and the command post 21, and effects the operational supervision and the energy supply (see also FIG. 2). In the embodiment shown, the unmanned aircraft 2 is a helicopter with a rotor head 4 at which rotor blades 5 are mounted, and the control or steering of the aircraft 2 is effected in known manner by means of cyclic and collective rotor blade displacement and/or by changing the power of the drive installation. Such a construction of the aircraft 2 is not, however, a prerequisite for the inventive stabilization, but instead an aircraft with, for example, lifting fans or the like with corresponding control or steering possibilities, such as control nozzles, also may be employed.

In the embodiment shown, reference numeral 6 identifies the cable or mooring line secured to the aircraft 2 in the mooring or anchoring point $F_F$ below the aircraft center of gravity S. Mounted on the vehicle 1 serving as a ground station is a mooring line winch 7 on whose cable drum the mooring line 6 may be wound and unwound. The point at which the mooring line 6 winds off the cable drum, and at which the mooring line 6 contacts with the cable drum during winding, has been defined as ground tying point $F_B$. The vehicle 1 carries, moreover, a launcher 9 for the aircraft 2. $A_K$ is the deviation cone which indicates the horizontal deviation of the aircraft 2 from the vertical V above the ground tying point $F_B$. Inserted in the immediate proximity of the aircraft 2 between the aircraft and the mooring line 6 or within the mooring line 6 is a cable line traction measuring device 12 which is responsive to tension and which cooperates with a regulating device for the cable line traction that will be described in further detail hereinafter.

Figure 1A:
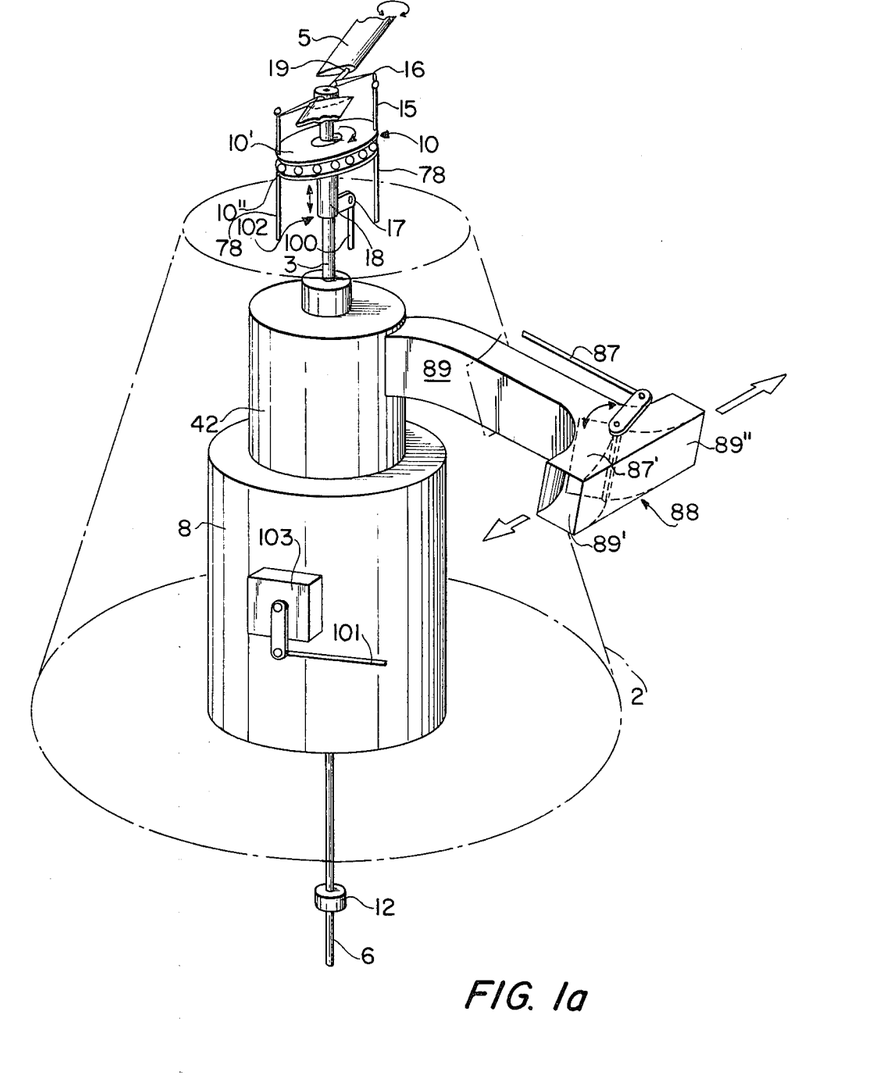
FIG. 1a is a perspective view of the captive unmanned aircraft of the present invention.

The embodiment illustrated in FIGS. 1 and 1a is a rotorcraft of known design. The longitudinal, transverse and vertical control of such aircraft is obtained by regulating the output of the drive unit 8 for the rotor drive together with its rotor blades and simultaneously by adjusting the rotor blades. Control further requires yaw regulation.

As is known, the rotor blades 5 may be adjusted about their longitudinal axes in order to change the angle of incidence. Two kinds of control act on the rotor blades 5. One kind is cyclic, the other is the collective adjustment of the rotor blades.

A yaw tail assembly control nozzle 88 furthermore is provided, by means of which the aircraft may be trued about its vertical axis. The yaw tail assembly furthermore is used to generate a counter-torque to the moment of the main rotor.

Figure 3:
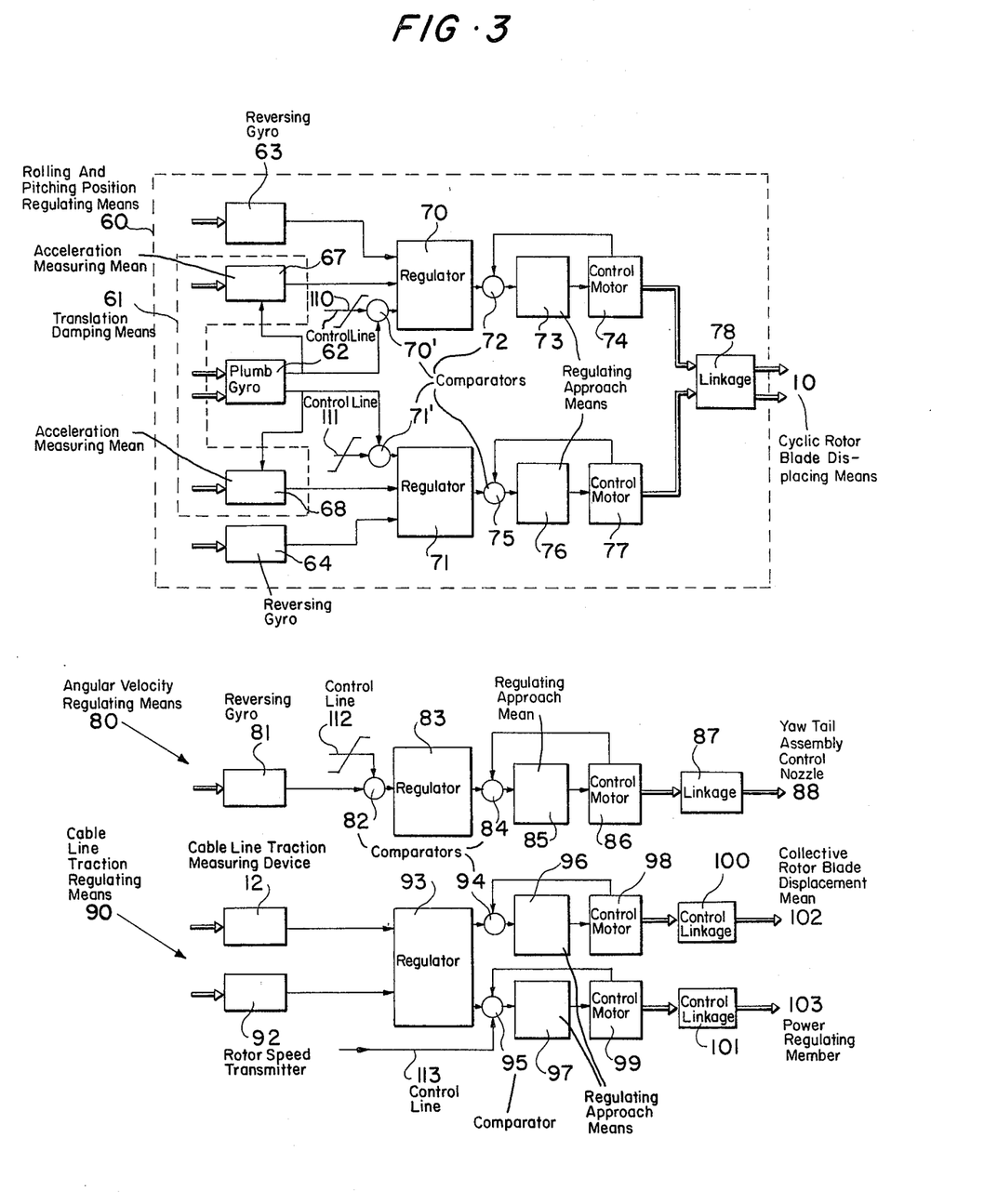
FIG. 3 illustrates, in the form of a block diagram, the construction of the control and regulating device on board.

As shown by FIG. 1a, the cyclic rotor blade adjustment 10, FIG. 3, includes the control linkage 78 connected to the control motors 74 and 77; FIG. 3, of the cyclic rotor blade displacing means 10 with its wobble plate parts 10' and 10" which may rotate with respect to each other, the pushrods 15 and the rotor blade levers 16. The latter engage the pivoting axles 19 of the rotor blades 5. The wobble plate 10 is of such design that the wobble plate part 10" does not rotate, whereas the wobble plate part 10' together with the pushrods 15 and the rotor blade levers 16 rotates in unison with the rotor blades 5. A roller bearing is provided between the wobble plate parts 10' and 10". The wobble plate 10 and its parts 10' and 10" may be omnidirectionally dipped with respect to the horizontal as a function of a roll and pitch control means 60 and of a translation damping means 61; this will be elucidated further below. Dipping the wobble plate moves the rotor blade levers 16 by means of the pushrods 15 together with the pivoting axles 19, the rotor blades 5 being cyclically brought into a given position of incidence. Thereby, the aircraft 2 will be controlled about its roll and pitch axes and also with respect to translational motion.

The collective rotor blade displacement means 102 is provided in known manner with an adjustment member 18 engaging the wobble plate 10 and concentric with the drive shaft 3 of the rotor 4 connected to the drive shaft of the drive unit 8. The wobble plate 10 may be displaced in the direction of the lengthwise axis of the drive shaft 3 by means of a control linkage 100 and an adjustment lever 17, and also by means of cable line traction regulating means 90 which will be further discussed below. When the wobble plate is so adjusted, the rotor blades 5 will be set by an equal angular amount with respect to the incident flow by means of the pushrods 15, the rotor blade levers 16 and the pivoting axles 19. The collective adjustment of the rotor blades may be superposed on the cyclic rotor blade adjustment, as may be seen from the drawings. Vertical control of the aircraft is obtained by means of the collective rotor blade adjustment.

The aircraft 2 further is equipped with a yawing tail, which in this case comprises a yawing tail assembly control nozzle 88. A compressor 42 is connected to the drive unit 8 for the rotor 4, the output of the compressor being fed to a jet supply channel 89 leading to the control nozzle 88. The latter is provided with two branching channels issuing in the jet exhausts 89' or 89" to the outside. The exhausts point in opposite directions. A control flap 87' is inserted into the jet supply channel 89; the flap may be pivoted about one axle. This axle is connected to an angular velocity regulating means 80, which will be discussed below, by means of an adjustment linkage 87. The air jet delivered from the compressor 42 may be fed through the control flap 87' either to the exhaust 89' or to the exhaust 89" or also to both in common. If equal amounts of air are fed to the jet exhausts 89' and 89", then the jet reaction forces will neutralize each other and the aircraft will not rotate about its vertical axis. If, however, different amounts of air are fed to the jet exhausts 89' and 89", then the aircraft will rotate in one sense or the other about its vertical axis.

As already described, the aircraft 2 includes a drive unit 8 the output shaft of which is connected with the drive shaft 3 of the rotor 4. The output from the drive unit 8 is controlled in known manner by means of the output or power regulating member 103 and the control linkage 101 of a cable line traction regulating means 90, which will be further described below.

According to FIG. 2, the guide post 20 and the command post 21 are coordinated to the ground station 1. The guide post 20 includes the guiding indicators 22, as well as the steering members 28. Provided in this case as the indicators 22 are the position indicator 23, the deviation indicator 24, the azimuth indicator 25, as well as the cable line traction indicator 26 and the rotor speed indicating means 27. Provided as steering members are the aboveground steering member 29, the yaw steering or control member 30, and the output or power regulating member 31. The command post 21 contains the azimuth indicator 32 as well as the azimuth control 33.

The command post and the guide post 21 and 20 are connected to the mooring line 6 by way of guide electronic element 34 and a data end point 36. The mooring line 6 which serves, in addition to the traction transmission and for the fuel supply, also for the transmission of control signals, operational supervision signals and the like, is connected via the data end point 37 at the aircraft 2 to the on-board control and regulating device. This device is composed of the flight regulating sensors 40, the flight regulating electronic element 35, and the controlling drive means 41 of the control mechanism.

Represented in FIG. 3 is the on-board stabilizing device of the unmanned captive aircraft 2. The stabilizing device is composed in this case of the following individual elements: the position regulating means 60 for the rolling and pitching axes, an angular velocity regulating means 80 for the yaw axis, a translation damping means 61 for the longitudinal and the transverse axes, as well as a cable line traction regulating means 90 operating in dependence upon the cable line traction in immediate proximity to the aircraft 2.

The rolling and pitching position regulating means 60 comprises a perpendicular or plumb gyro 62 and two turning or reversing gyros 63 and 64. Furthermore, the translation damping means 61 works with two acceleration measuring means 67 and 68. The values measured and the signals formed therefrom are supplied to the regulators 70 and 71 for the rolling and pitching axes, and by way of comparators 72 and 75 as well as the regulating approach means 73 and 76 to the control motors 74 and 77. From the control motors there is a mechanical transmission of the displacing movement to the linkage 78, and connected to the outlet of the latter is the cyclic rotor blade displacement means 79.

The angular velocity regulating means 80 for the yaw axis contains a turning or reversing gyro 81 whose signal, formed from the measured value, is fed by way of the comparator 82 to the regulator 83 for the yaw axis, and then to the comparator 84. The comparator 84 is connected to the regulating approach means 85, and the output signal thereof influences the control motor 86. From the control motor 86, the linkage 87 is mechanically displaced, and the yaw tail assembly control nozzle 88 connected thereto is actuated thereby.

The flight regulating sensors 62, 63, 64, 67, 68 and 81 are mounted in the aircraft 2 and constitute a closed system. As per the arrangement shown they may be combined to form a measuring package (for example a gyro platform).

The cable line traction regulating means 90 contains the cable line traction transmitter 12 and a rotor speed transmitter 92. The signals of the transmitters 12 and 92 are fed to the regulator 93 and the output thereof controls, by way of the comparators 94 and 95 and the regulating approach means 96 and 97, the control motors 98 and 99. The control motors 98 and 99 are mechanically connected to the control linkage 100 for the collective rotor blade displacement means 102 of the rotor 4 and the control linkage 101 for the output or power regulating member 103 of the propulsion unit.

In the operation of the inventive stabilizing device 1, by way of the cable line traction regulating means 90 at the upper mooring line tying point $F_F$ (FIG. 1), a uniform cable line traction is effected. In order to achieve this, the extent of the cable line traction is detected with the cable line transmitter 12 in the connecting point $F_F$ of the mooring line 6 at the aircraft 2. The setting of an approximately constant cable line traction is achieved by the cable line traction regulating means 90, on the one hand, in the case of rapid rotor thrust variations, for example due to wind stresses or cable oscillations, by collective rotor blade displacing means 102, and on the other hand, in the case of slow rotor thrust variations as a result of rotor speed variations, by way of the power or output regulating member 103 of the propulsion unit. The cable line traction regulating means 90 thus is composed of a rapid and of a slow radius of action. The rapid radius of action is constituted by the cable line traction transmitter 12 and the regulator 93 with the control members 98 and 100, while the slow radius of action is composed of the rotor speed transmitter 92, the regulator 93, as well as the control members 99 and 101. When the cable line traction is too small, the lower cable line hinge point $F_B$ at the ground station 1 is relieved, and, as a result, the return effect via the mooring line 6 on the aircraft 2 is lost. This results in inadmissably high drifts of the aircraft. The cable line traction at the aircraft therefore must be maintained at least greater than the weight of the mooring line 6. On the other hand, the cable line traction at the aircraft must not exceed a specific value since, with increasing cable line traction, the rotatory inherent frequency about the pitching and rolling axes increases, and a control or steering of the aircraft by cyclic rotor blade displacement is no longer possible.

The cable line traction, in conjunction with the rotor thrust, constitutes a pair of forces for the steering of the aircraft in the rolling and pitching axes, as well as in the longitudinal and transverse movements. The co-action of both forces, namely the cable line traction and the rotor thrust, brings about an approximately constant dynamic behavior of the aircraft 2 with respect to the rolling and pitching axes as well as the longitudinal and transverse movements. This in turn is the prerequisite for the action sequence in the position regulation or position feedback control system 60 and the translation damping means 61.

Both the regulation of the position about the rolling and pitching axes and also the damping of the translation movement of the aircraft 2 are necessary for maintaining a stable flying condition. Both movements are strongly coupled with each other in such captive aircraft. It is for this reason that a stabilization can be achieved only in conjunction with a translation damping means 61. Under the prerequisite which is given by the cable line traction regulating means 90, the position regulation 60 and the translation damping 61 takes place in the following manner:

Both the measured values of the perpendicular gyro 62 and of the turning or reversing gyros 63 and 64 for the position regulation, and also the measured values of the acceleration transmitters 67 and 68 for the translation damping are fed coupled to the regulator 70 for the rolling axis and the regulator 71 for the pitching axis. Starting from the regulators 70 and 71, a coupled control signal is applied to the control motors 74 and 77, and a corresponding displacement of the cyclic rotor blade displacement means 79 of the rotor 4 is effected by way of the control linkage 78. The cyclic rotor blade displacement means 79 of the rotor 4 has the effect that the aircraft 2 initially executes a position movement in the rolling and pitching axes, and therewith initiates a translatory longitudinal and transverse movement.

The operation of the angular velocity regulating means 80 is so that the angular velocity about the yaw axis is maintained at a predetermined value, for example an angular velocity equal to zero. For this purpose, the angular velocity about the yaw axis is measured with the turning or reversing gyro 81 and supplied to the regulator 83 whose control signal is further transmitted by way of the control motor 86 to the control linkage 87 for the control or steering of the yaw tail assembly control nozzle 88. The yaw tail assembly control nozzle 88 produces a control or steering moment about the yaw axis in which, through a control channel propulsion unit, exhaust gases are diverted to the nozzle in a suitable manner. The angular velocity regulating circuit 80 is so designed that in stationary operation the angular velocity about the yaw axis is equal to zero. In a captive rotary wing aircraft, the movement about the yaw axis is almost completely uncoupled from the movement about the pitching and rolling axes and from the longitudinal and transverse movement. Since the movement of the aircraft about its yaw axis is nearly undamped, a stabilization of the yaw velocity is necessary in order that one may achieve a stable flying condition of the aircraft.

Figure 4:
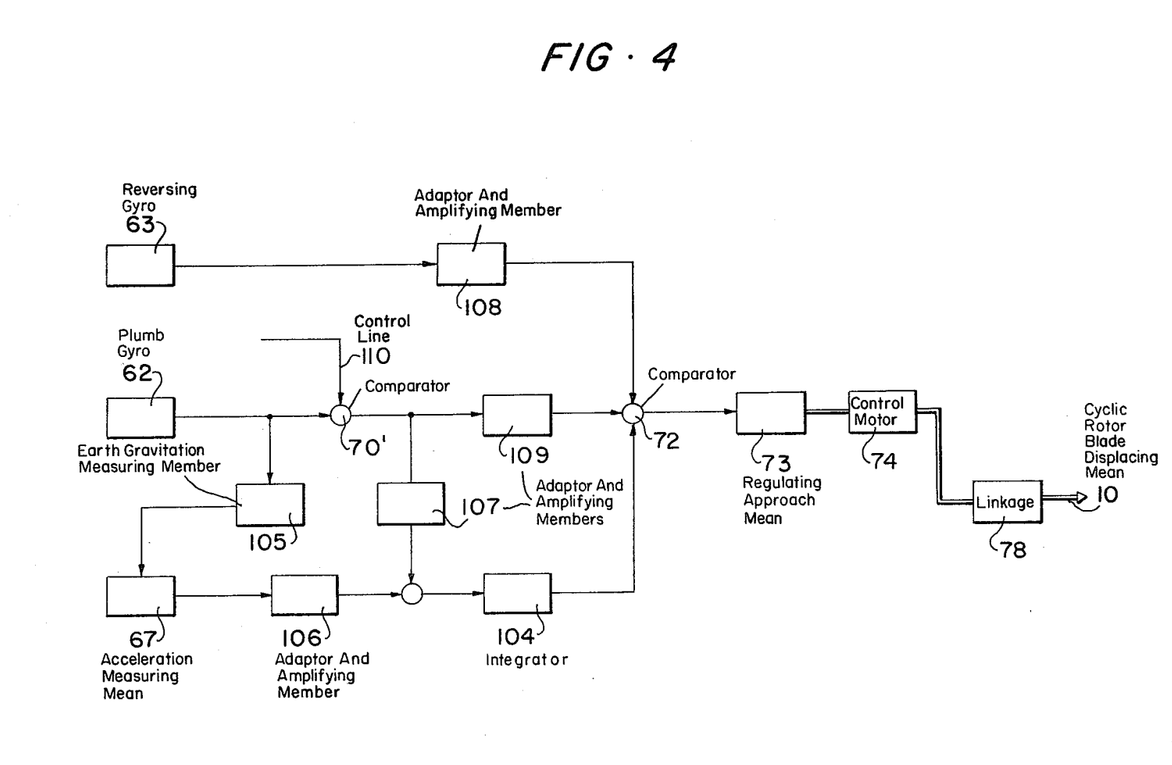
FIG. 4 illustrates a construction of the position regulation and translation damping according to FIG. 3.

Shown in FIG. 4 is a special construction of the position regulation and of the translation damping in the rolling and pitching axes which is intended to particularly characterize how the translation damping is coupled with the position regulation with respect to signals. For the sake of simplicity, only the position regulation and translation damping about the rolling axis is described in this case. The position regulation operates as usual with proportional and integral input of the position signal from the perpendicular gyro 62, as well as proportional input of the turning or reversing gyro 63. For the translation damping, the signal - being compensated by the portion of the earth gravitation by the member 105 - of the acceleration transmitter 67 is guided to an integrator 104 which proceeds with the integration of the position signal for the position regulation from the perpendicular gyro 62. Numerals 106, 107, 108 and 109 represent adaptor and amplifying members which are connected in tandem with respect to the perpendicular gyro 62, the turning or reversing gyro 63 and the acceleration transmitter 67. By way of the comparator 72 and the control approach means 73, the control motor 74, as well as the control linkage 78, the cyclic rotor blade displacement 79 is set as has already been described in connection with FIG. 3.

Of importance in this construction is the joint integration of the position signal from the perpendicular gyro 62 and of the compensated signal from the acceleration transmitter 62 by means of a single integrator 104. This has the advantage that variations in the compensation of the earth gravitation will in this case not become manifest in significant translational movements of the aircraft. It is thereby prevented that, with respect to a separate integration, for example in parallel connection of integrators, the latter drift apart, or in cascade connection of integrators, due to compensation variations, considerable translational movements of the aircraft be caused.

As already has been set forth hereinbefore and described in connection with FIG. 2, the possibility exists of influencing the stabilization by electrical signal input from the guide post 20 and the command post 21 of the ground station 1, either automatically or manually. The possible interventions from the ground station in the stabilizing device have the effect that the aircraft in its position, steered above ground, may be aligned in the azimuth in its direction over 360°, as well as trimmed in its propulsion unit output.

As is apparent from FIGS. 2 and 3, it is possible to intervene with regard to the cable line traction regulating means 90 (FIG. 3) by means of the control member 31 in the guide post 20 of the ground station 1 by way of the guide electronic means 34, as well as the mooring line 6 and by way of the control line 113 as well as the comparator 95. The signal supplied from the ground station to the comparator 95 steers by way of the control approach means 97 and the control motor 99, as well as the linkage 101 for the output regulating member 103 of the propulsion unit, for purposes of trimming the propulsion unit output.

Likewise it is possible to submit, by means of the control member 29 in the guide post 20 of the ground station 1, the guide electronic means 34, and the mooring line 6, the desired values for the rolling and pitching positions as electrical signals by way of the control lines 110 and 111 to the comparators 70' and 71'' of the position regulation 60 (FIG. 3). From the comparators 70' and 71', the cyclic rotor blade displacement 79 is headed for, either via the regulator 70 or 71 and the control motors 74 or 77.

Provided for the alignment of the aircraft in the azimuth is the control member 33 of the command post 21. By actuating the control member 33, control signals are supplied to the comparator 84 of the angular velocity regulation 80, equally by way of the guide electronic means 34 and the mooring line 6, as well as via the control line 112, and therewith the control approach means 85 and the control motor 86 headed for. By means of the linkage 87, the yaw tail unit control nozzle 88 is then mechanically displaced.

It will be obvious to those skilled in the art that many modifications may be made within the scope of the present invention without departing from the spirit thereof, and the invention includes all such modifications.

What is claimed is:

1. In a device for the stabilization of a captive rotorcraft with a drive unit, with output regulating means, for lifting rotor blade means having cyclic and collective control of said rotor blade means, and wherein a mooring line engages below the rotorcraft center of gravity, the improvement comprising position regulating means and translation damping means for the purpose of maintaining predetermined reference values relating to all rotorcraft axes and to translation, and adapted to influence the cyclic control of said rotor blade means, cable line traction regulating means adapted to influence said output regulating means and said collective control of said rotor blade means, said cable line traction regulating means being adapted to operate in dependence upon cable line traction in immediate proximity to the rotorcraft and in dependence upon rpm of said rotor blade means, and angular velocity regulating means for influencing a yaw tail assembly control nozzle means for adjusting the position of the rotorcraft about its vertical axis by generating a control thrust.

2. In a device for the stabilization of a captive rotorcraft with a drive unit, with output regulating means, for lifting rotor blade means adjustable with respect to the magnitude and direction of lift, and wherein a mooring line engages below the rotorcraft center of gravity, the improvement comprising position regulating means and translation damping means for the purpose of maintaining predetermined reference values relating to all rotorcraft axes and to translation, and adapted to influence said lifting rotor blade means, cable line traction regulating means adapted to influence said output regulating means and said lifting rotor blade means, said cable line traction regulating means being adapted to operate in dependence upon cable line traction in immediately proximity to the rotorcraft and in dependence upon rpm of said rotor blade means, angular velocity regulating means for influencing yaw control, ground station means adapted to intervene in the stabilization by means of a predetermined electrical signal of a nominal position value for the purpose of above-ground control, said position regulating means and translation damping means being coupled together, and signals corresponding to deviations from roll and pitch axes of the rotorcraft, together with a corresponding deviation in translation, combining in one output signal to control cyclic adjustment of said rotor blade means.

3. In a device for the stabilization of a captive rotorcraft with a drive unit, with output regulating means, for lifting rotor blade means adjustable with respect to the magnitude and direction of lift, and wherein a mooring line engages below the rotorcraft center of gravity, the improvement comprising position regulating means and translation damping means for the purpose of maintaining predetermined reference values relating to all rotorcraft axes and to translation, and adapted to influence said lifting rotor blade means, a single integrator means inserted in the position regulating means and the translation damping means for integrating the deviation of an actual position value from a desired position value and an acceleration signal compensated by earth accelerations, cable line traction regulating means adapted to influence said output regulating means and said lifting rotor blade means, said cable line traction regulating means being adapted to operate in dependence upon cable line traction in immediate proximity to the rotorcraft and in dependence upon rpm of said rotor blade means, and angular velocity regulating means for influencing yaw control.

* * * * *